Nov. 26, 1935.  H. P. SORENSEN  2,022,607
TREE CONTAINER
Filed Nov. 12, 1934
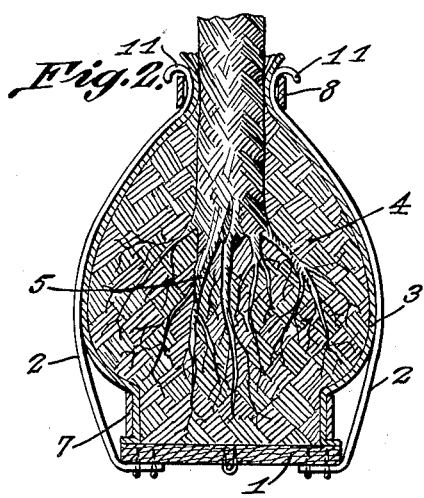
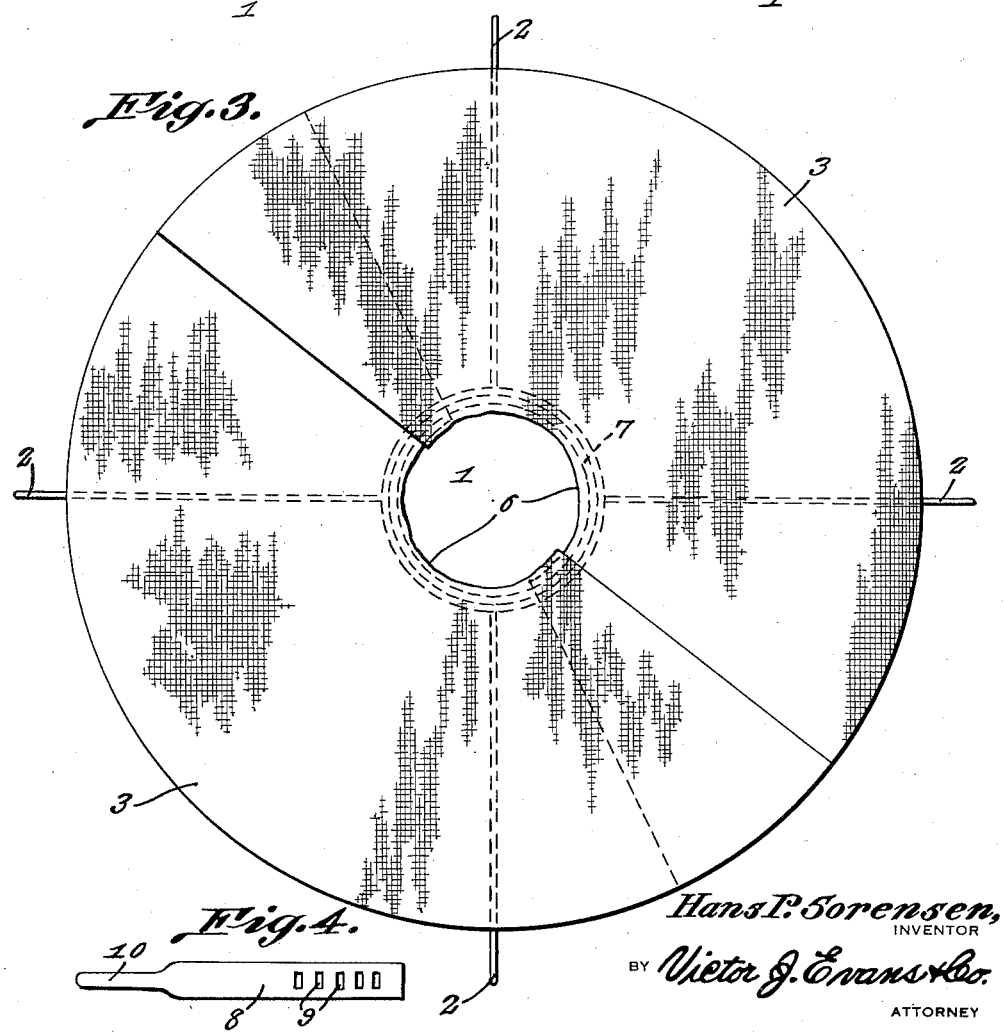
Hans P. Sorensen, INVENTOR
BY Victor J. Evans & Co.
ATTORNEY Patented Nov. 26, 1935

2,022,607

UNITED STATES PATENT OFFICE 2,022,607

TREE CONTAINER

Hans Peter Sorensen, Peninsula, Ohio

Application November 12, 1934, Serial No. 752,748

5 Claims. (Cl. 55—119)

This invention relates to plant transportation and the principal object is to provide inexpensive means for protecting the roots of a plant during shipment, a further object being to provide such a protector which may be easily applied to large plants and small trees and will hold a ball of dirt large enough to nourish the roots until the plant reaches its destination. These stated objects and other objects which will appear as the description proceeds are attained in such a device as is illustrated in the accompanying drawing and the invention resides in certain novel features which will be particularly defined in the appended claims.

In the drawing:

Figure 1 is an elevation of the root portion of a tree prepared for shipment according to my invention.

Figure 2 is a vertical section of the same.

Figure 3 is a plan view, on a larger scale, showing the wrapper spread before being closed around the tree.

Figure 4 is a detail of the fastening strap.

In the practice of the invention, there is provided a base block 1 of wood which is preferably circular and may be in various sizes to meet the demand for any particular tree. Secured to the under side of the block 1 in any convenient manner are retainers 2 which may be stout wires or light rods adapted to be folded upward around the tree and fastened at their upper ends. A wrapper 3 of some suitable material is employed to be folded around the ball of dirt 4 packed around the roots 5, and this wrapper may be waterproofed, if desired, to retain moisture around the roots through a long period. As shown in Figure 3, the wrapper consists of two semicircular sections having central semicircular recesses 6 in their radial edges and having said radial edges overlapping so as to enclose root balls of various sizes. A collar or ring 7 of veneer or other light cheap material holds the wrapper around the lower end or base of the root ball and a strap 8 fastens the upper ends of the wrapper and the wire retainers around the tree. The strap is a short strip of light flexible metal having a series of transverse slots 9 in one end portion and having its opposite end reduced to form a tongue 10 which may be engaged in one of the slots after being bent around the tree, as shown in Figure 1.

In use, the inner portion of the wrapper is passed through the collar 7 with its edge between the collar and the base, the retaining wires having been extended radially from the base. The wrapper is then spread out over the upper edge of the collar, as shown in Figure 3, and dirt is packed into the collar to fill the same. The tree with the ball of dirt around its roots is then brought into position and the wrapper and retainers are then folded up around the ball and the tree trunk, as shown in Figures 1 and 2. The strap is then passed around the upper ends of the retainers and the wrapper and fastened, the ends of the retainers being bent over the upper edge of the strap, as shown at 11.

It will be noted that the device is very simple and easily applied and effectually protects the roots. When the plant reaches its destination, the container may be easily removed and may be thrown away because of its cheapness, but while on the tree the wrapper prevents disintegration of the root ball and the retainers bear against the wrapper so that it cannot pull away from the ball. The ball, it will be noted, overhangs the collar 7 so that the collar cannot ride up but will be held upon the edge of the wrapper which will be thereby clamped to the base.

The device is intended primarily for use in shipping Christmas trees but it may, of course, be used in transporting other plants.

Having described my invention, what I claim is:

1. A plant package comprising a base, a wrapper clamped to the base to enclose a root ball resting on the base, and a plurality of spaced wire rods secured to the base and bendable upward for securing the wrapper about the trunk of the plant.

2. A plant package comprising a base, a wrapper having an edge portion resting on the base, the wrapper being adapted to enclose a root ball, a collar encircling the lower portion of the wrapper and held to the base by the root ball to clamp the edge portion of the wrapper to the base, and means for securing the upper portion of the wrapper about the trunk of the plant.

3. A plant package comprising a base, radially disposed wire rods forming retainers secured to the base, a wrapper on the base and adapted to enclose a root ball, a collar for clamping the wrapper to the base, the retainers passing upwardly and holding the wrapper to the root ball, and means for securing the upper ends of the wrapper and the retainers about the trunk of the plant.

4. A plant package comprising a base, retainers secured to the base, a wrapper held on the base and adapted to enclose a root ball, the retainers passing upwardly and holding the wrapper to the root ball, and a strap fastened about the upper ends of the wrapper and the retainers.

5. A plant package comprising two similar arcuate sections of wrapping material having overlapping radial edges and having central semicircular recesses in said edges, a base, means for clamping the central semicircular edges of the sections to the base, retainers for holding the sections upon a looped ball, and means for securing the outer edges of the sections and the ends of the retainers to the trunk of the plant.

HANS PETER SORENSEN.